United States Patent
Apostolides

(10) Patent No.: US 12,478,902 B2
(45) Date of Patent: Nov. 25, 2025

(54) SYSTEM INCLUDING A REUSABLE OIL FILTER

(71) Applicant: RPM INDUSTRIES, LLC, Washington, PA (US)

(72) Inventor: John K. Apostolides, Pittsburgh, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 363 days.

(21) Appl. No.: 16/358,454

(22) Filed: Mar. 19, 2019

(65) Prior Publication Data

US 2019/0282935 A1    Sep. 19, 2019

Related U.S. Application Data

(60) Provisional application No. 62/644,901, filed on Mar. 19, 2018.

(51) Int. Cl.
*B01D 29/15* (2006.01)
*B01D 29/66* (2006.01)
(Continued)

(52) U.S. Cl.
CPC .......... *B01D 29/15* (2013.01); *B01D 29/668* (2013.01); *B01D 35/16* (2013.01); *B01D 35/30* (2013.01)

(58) Field of Classification Search
CPC ........ B01D 29/15; B01D 35/16; B01D 29/21; B01D 29/58; B01D 29/668; B01D 35/143; B01D 2201/0415; B01D 2201/087; B01D 2201/184; B01D 2201/287; B01D 2251/404; B01D 2251/602; B01D 2253/112; B01D 2256/16; B01D 2256/20; B01D 2257/302; B01D 2257/404; B01D 2257/504; B01D 2259/40086; B01D 2259/4009; B01D 2275/302; B01D 27/00;
(Continued)

(56) References Cited

U.S. PATENT DOCUMENTS

| 3,421,630 A * | 1/1969 | Acosta ................. B01D 29/23 |
| | | 210/426 |
| 4,026,806 A * | 5/1977 | Drori ................... B01D 29/606 |
| | | 210/488 |

(Continued)

FOREIGN PATENT DOCUMENTS

| DE | 102007037525 A1 * | 2/2009 | ........... B01D 29/114 |
| ES | 2190882 A1 | 8/2003 | |

(Continued)

OTHER PUBLICATIONS

Smitha, Experimental studies on fuel filter coated with nanoparticles on the exhaust emissions of 4-stroke engine, Jul. 7, 2017, p. 1-3 (Year: 2017).*

(Continued)

*Primary Examiner* — Terry K Cecil
(74) *Attorney, Agent, or Firm* — K&L Gates LLP

(57) ABSTRACT

A system. The system includes a reuseable oil filter, a first port, a second port and a valve assembly. The reuseable oil filter has an inlet and an outlet, and includes a housing and a filter element positioned within the housing. The valve assembly is in selective fluid communication with the reuseable oil filter, the first port and the second port.

12 Claims, 3 Drawing Sheets

(51) Int. Cl.
*B01D 35/16* (2006.01)
*B01D 35/30* (2006.01)

(58) Field of Classification Search
CPC ...... B01D 27/06; B01D 27/106; B01D 29/23; B01D 29/48; B01D 29/601; B01D 29/606; B01D 29/66; B01D 29/661; B01D 29/902; B01D 29/906; B01D 29/908; B01D 29/925; B01D 29/96; B01D 35/147; B01D 35/157; B01D 35/30; B01D 36/003; B01D 37/025; B01D 41/04; B01D 46/403; B01D 53/08; B01D 29/114; B01D 27/103; B01D 27/10; B01D 27/08; B01D 35/00; B01D 2201/165; A01K 63/045; B08B 9/00; B08B 9/0813; B09B 2220/08; B09B 3/0058; C10K 1/024; F01M 11/03; F01M 11/045; F01M 11/0458; F01M 2001/1014; F01M 11/04; F01M 13/04; F01M 1/10; F16N 2033/005; Y02C 10/08; Y02C 20/40; Y02P 20/151; Y02P 20/152; Y10S 210/13; Y10S 210/17
USPC ......................................... 210/108, 413, 414
See application file for complete search history.

(56) References Cited

U.S. PATENT DOCUMENTS

| | | | | |
|---|---|---|---|---|
| 4,624,785 A * | 11/1986 | Drori | .................. | B01D 29/684 |
| | | | | 210/488 |
| 4,906,357 A * | 3/1990 | Drori | .................. | B01D 29/114 |
| | | | | 210/411 |
| 5,145,033 A * | 9/1992 | Bedi | .................. | B01D 35/306 |
| | | | | 184/6.24 |
| 5,526,782 A * | 6/1996 | Bedi | .................. | F01M 11/0458 |
| | | | | 123/196 A |
| 5,779,900 A * | 7/1998 | Holm | .................. | B01D 29/15 |
| | | | | 210/411 |
| 5,855,794 A * | 1/1999 | Caracciolo, Jr. | ....... | B01D 33/11 |
| | | | | 210/791 |
| 5,957,170 A | 9/1999 | Bedi et al. | | |
| 6,068,762 A * | 5/2000 | Stone | .................. | B01D 29/21 |
| | | | | 210/90 |
| 6,652,740 B2 * | 11/2003 | Schoess | .................. | B01D 37/046 |
| | | | | 210/90 |
| 6,853,203 B2 * | 2/2005 | Beylich | .................. | B01D 29/60 |
| | | | | 324/698 |
| 11,612,841 B2 * | 3/2023 | Spengler | .................. | B01D 35/143 |
| | | | | 210/90 |
| 2005/0092184 A1 | 5/2005 | Becker | | |
| 2006/0254986 A1 * | 11/2006 | Hanson | .................. | F01M 11/03 |
| | | | | 210/171 |
| 2009/0056542 A1 | 3/2009 | Carew | | |
| 2012/0199528 A1 | 8/2012 | Beplate | | |
| 2014/0290761 A1 * | 10/2014 | Apostolides | ....... | F01M 11/0458 |
| | | | | 137/511 |
| 2016/0032603 A1 | 2/2016 | Heg | | |
| 2018/0066803 A1 | 3/2018 | Apostolides et al. | | |

FOREIGN PATENT DOCUMENTS

| | | |
|---|---|---|
| JP | 7-35300 A | 6/1995 |
| JP | 2003-154216 A | 5/2003 |
| JP | 2011-183257 A | 9/2011 |
| JP | 2014136194 A | 7/2014 |
| WO | 2014054086 A1 | 4/2014 |

OTHER PUBLICATIONS

CPC, The benefits of Quick Connect and Disconnect Couplings, Mar. 7, 2017, p. 1-3 (Year: 2017).*
Langfitt et al., Assessment of Lube Oil Management and Self-Cleaning Oil Filter Feasibility in WSF Vessels, Oct. 31, 2014, p. 18-22 (Year: 2014).*
English Translaton of DE 102007037525 A1 (Year: 2009).*
International Preliminary Report on Patentability for International Application No. PCT/US2019/023006, mailed Oct. 1, 2020.
International Search Report and Written Opinion of the International Searching Authority for International Application No. PCT/US2019/023006, dated May 24, 2019.
Extended European Search Report for European Application No. 19771313 dated Oct. 6, 2021, 8 pages.

* cited by examiner

SYSTEM INCLUDING A REUSABLE OIL FILTER

CROSS-REFERENCE TO RELATED APPLICATION

This application claims the benefit under 35 U.S.C. § 119(e) of the earlier filing date of U.S. Provisional Patent Application No. 62/644,901 filed on Mar. 19, 2018, titled SYSTEM INCLUDING A REUSEABLE OIL FILTER, the contents of which are hereby incorporated by reference in their entirety.

BACKGROUND

Oil filters are utilized with many different types of apparatuses. In general, conventional oil filters include a housing and a filter element positioned within the housing. For conventional oil filters such as the one shown in FIG. 1, unfiltered or dirty oil which is pressurized enters an inlet of the oil filter, flows between the housing and an outer surface of a filter element, then passes through the filter element which functions to trap particles in the oil. The oil which has passed through the filter element is considered filtered or cleaned oil, is still pressurized, and subsequently exits an outlet of the oil filter. The arrowed lines shown in FIG. 1 are representative of the path traveled by the oil. Over time, the filter element becomes more and more clogged by the trapped particles, eventually reaching the point where the oil filter has to be replaced.

In general, there are many costs incurred when the oil filter has to be replaced. For example, the cost of a replacement oil filter, the cost of labor required to remove the old oil filter and install the new oil filter, the cost associated with the downtime of the apparatus the oil filter is utilized with, the cost associated with transporting the apparatus to a service facility, the cost of replacement oil, disposal costs, clean-up costs, etc. are all costs which can be incurred when an oil filter is replaced. Therefore, substantial long-term savings can be realized by utilizing an oil filter which can be cleaned and reused without having to be disconnected/removed.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
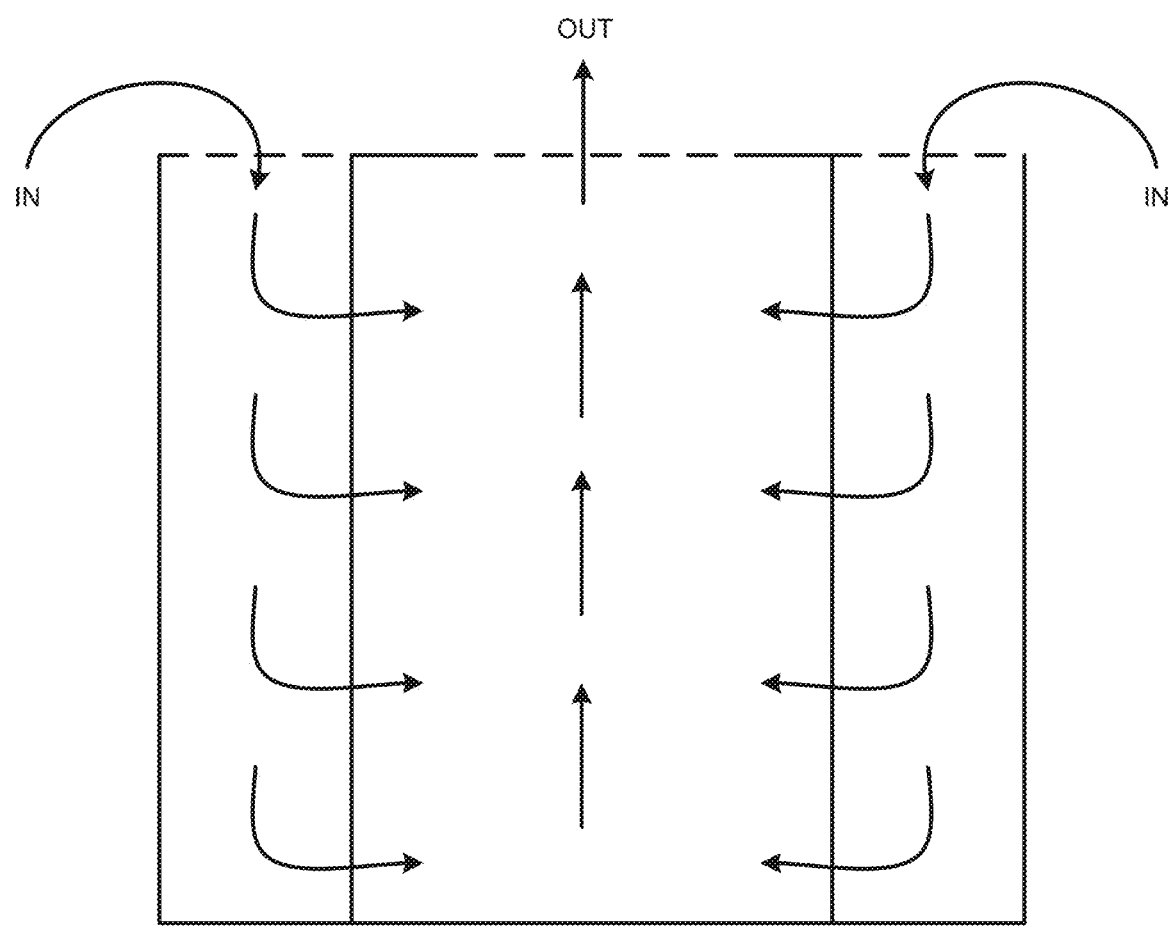
FIG. 1 illustrates a cross-section of a prior art oil filter.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the reuseable oil filter in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the reuseable oil filter disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 2:
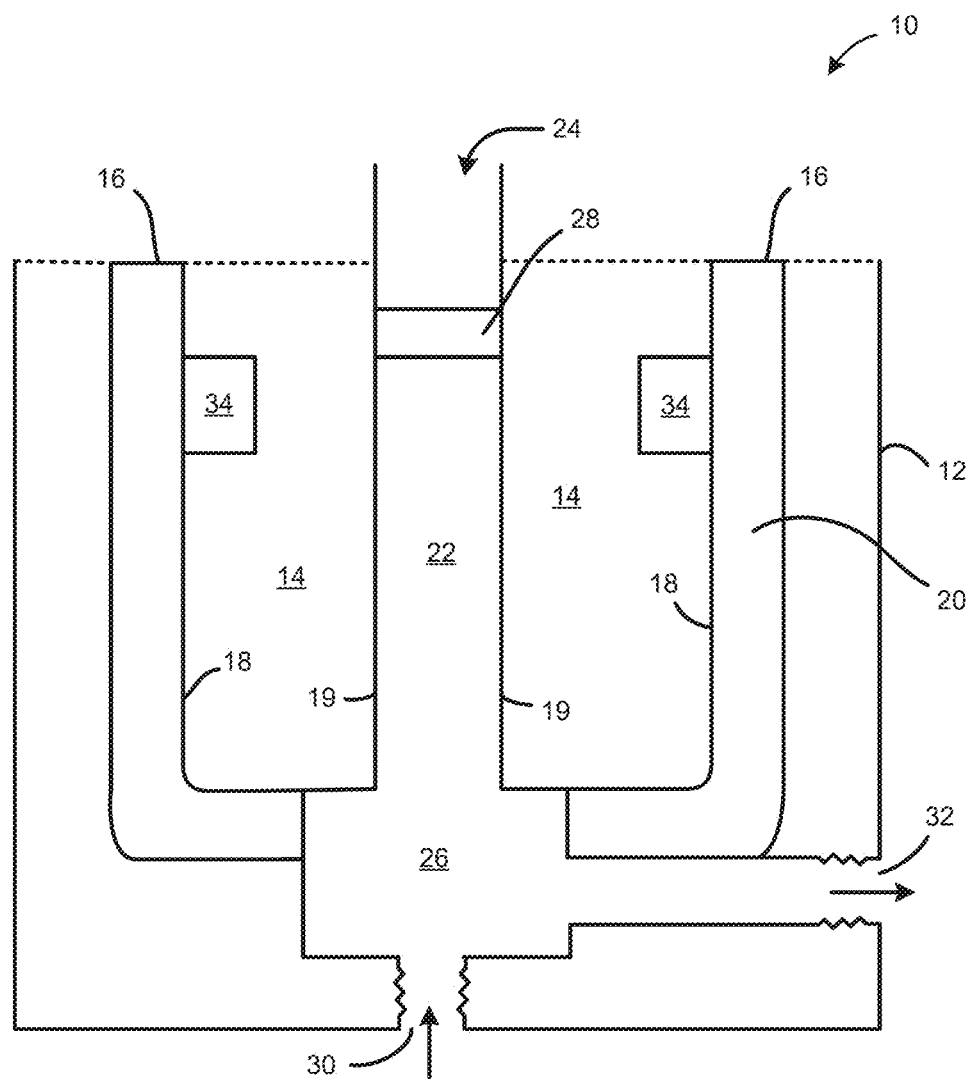
FIG. 2 illustrates a cross-section of a reuseable oil filter according to various aspects.

FIG. 2 illustrates various aspects of a reuseable oil filter 10. The reuseable oil filter 10 may be utilized with any number of different apparatuses and systems. For example, according to various aspects, the reuseable oil filter 10 may be utilized with an internal combustion engine. According to other aspects, the reuseable oil filter 10 may be utilized with a transmission, a hydraulic machine, etc. For purposes of simplicity, the reuseable oil filter 10 will be described hereinafter in the context of an engine oil filter. However, it will be appreciated that the reuseable oil filter 10 may be utilized with any number of different apparatuses and systems other than an internal combustion engine.

The reuseable oil filter 10 includes a housing 12 and a filter element 14 positioned within the housing 12. During normal operation, the reuseable oil filter 10 is similar to a conventional oil filter in that unfiltered or dirty oil which is pressurized enters an inlet 16 of the reuseable oil filter 10, flows between the housing 12 and an outer surface 18 of the filter element 14 on a dirty side 20 of the reuseable oil filter 10, then passes through the filter element 14 to a clean side 22 of the reuseable oil filter 10. The oil which has passed through the filter element 14 is considered filtered or cleaned oil, is still pressurized, and subsequently exits an outlet 24 of the reuseable oil filter 10. Thus, the inlet 16 of the reuseable oil filter 10 may be considered to be fluidically coupled to the outlet 24 of the reuseable oil filter 10. For a cylindrical-shaped reuseable filter 10 as shown in FIG. 2, the dirty side 20 of the reuseable oil filter 10 is a volume proximate the outer surface 18 of the filter element 14 and the clean side 22 of the reuseable oil filter 10 is a volume proximate an inner surface 19 of the filter element 14.

The housing 12 may be fabricated from any suitable material. For example, the housing 12 may be fabricated from a metal. Similarly, the filter element 14 may be fabricated from any suitable material. For example, according to various aspects, the filter element 14 is fabricated from a metal. According to other aspects, the filter element 14 is fabricated from nanoparticles. The filter element 14 is configured to trap particles in the same manner as a normal filter.

According to various aspects, the reuseable oil filter 10 also includes a valve assembly 26, a blocking member 28 and two ports 30, 32. As described in more detail hereinbelow, the valve assembly 26, the blocking member 28 and the two ports 30, 32 allow for the reuseable oil filter 10 to be purged, evacuated and refilled—all without the reuseable oil filter 10 having to be removed. Although the valve assembly 26 is shown as being positioned within the housing 12, it will be appreciated that according to other aspects the valve assembly 26 may be positioned external to the housing 12. Similarly, although the blocking member 28 is shown as being positioned within the housing 12 (on the clean side 22 of the reuseable oil filter 10 in a conduit/path to the outlet 24), it will be appreciated that according to other aspects the blocking member 28 may be positioned external to the housing 12. Additionally, although the blocking member 28 is shown schematically as being separate and apart from the valve assembly 26, it will be appreciated that according to various aspects the blocking member 28 may comprise a portion of the valve assembly 26. Stated differently, according to various aspects, the valve assembly 26 comprises the blocking member 28.

The ports 30, 32 may be any suitable type of ports and may be utilized to couple the reuseable oil filter 10 to any suitable type of system. For example, according to various aspects, the ports 30, 32 are coupled to respective quick disconnects (not shown), where one of the quick disconnects is coupled to a purge and refill system and the other of the quick disconnects is coupled to an evacuation system. According to various aspects, the quick disconnects may be automatically connected to respective systems by a robotic device to minimize the need for human interaction.

The valve assembly 26 is configured to selectively control/allow for (1) the delivery of a cleaning fluid such as air or clean oil to the clean side 22 of the reuseable oil filter 10, (2) the delivery of new oil to the dirty side 18 of the reuseable oil filter 10 and (3) the evacuation of dirty oil from the dirty side 18 of the reuseable oil filter 10. For applications where an engine sump (not shown) is coupled to the port 32, the valve assembly 26 is also configured to selectively allow for the evacuation of dirty oil from the engine sump.

During a purge operation, which is different from the normal operation, the valve assembly 26 is controlled to allow a cleaning fluid such as air or clean oil to be delivered under pressure through the port 30 to the clean side 22 of the reuseable oil filter 10. Concurrently, the blocking member 28 is controlled to prevent the cleaning fluid and oil on the clean side 22 from passing out the outlet 24 of the reuseable oil filter 10. According to various aspects, the cleaning fluid may be delivered to the port 30 at a substantially greater pressure than that of the oil delivered to the reuseable oil filter 10 under normal operation. Once the cleaning fluid reaches the clean side 22 of the reuseable oil filter 10, the pressurized cleaning and any oil on the clean side 22 of the reuseable oil filter 10 is forced through the filter element 14 to the dirty side 20 of the reuseable oil filter 10, effectively dislodging all of the particles trapped by the filter element 14 during normal operation. During the purge operation, the valve assembly 26 may also be controlled to prevent the cleaning fluid, the oil and the dislodged particles on the dirty side 20 from exiting through the port 32. In view of the above, it will be appreciated that the flow pattern of the oil in the reuseable oil filter 10 during a purge operation (clean side 22 to dirty side 20) is the opposite or reverse of the flow of oil in the reuseable oil filter 10 during normal operation (dirty side 20 to clean side 22).

Once the cleaning fluid, the oil and the dislodged particles are on the dirty side 20 of the reuseable oil filter 10, or concurrently with the purge operation, an evacuation operation may be utilized to evacuate the cleaning fluid, the oil and the dislodged particles from the dirty side 20 of the reuseable oil filter 10 and deliver the cleaning fluid, the oil and the dislodged particles to an external system (not shown) via the port 32. During the evacuation operation, which is different from the normal operation, the valve assembly 26 is controlled to allow for the cleaning fluid, the oil and the dislodged particles to be delivered under pressure to the port 32. The valve assembly is also controlled to prevent the cleaning fluid from being sucked in through the port 30. According to various aspects, the blocking member 28 may be controlled during the evacuation operation to prevent oil upstream of the outlet 24 from being sucked into the clean side of the reuseable oil filter 10.

Once the cleaning fluid, the oil and the dislodged particles have been evacuated through the port 32, a refill operation may be performed to supply clean oil to the reuseable oil filter 10. During the refill operation, which is different from the normal operation, the valve assembly 26, in certain aspects, is controlled to allow new oil to be delivered under pressure through the port 30 to the dirty side 20 of the reuseable oil filter 10. According to other aspects, the valve assembly 26 is controlled during a refill operation to allow ultra-filtered new oil to be delivered under pressure through the port 30 to the clean side 22 of the reuseable oil filter 10. The valve assembly 26 may also be controlled to prevent the introduced oil from exiting through the port 32. In some aspects, the blocking member 28 is controlled to allow the introduced oil to pass through the outlet 24 of the reuseable oil filter 10. In other aspects, the blocking member 28 is controlled to prevent the introduced oil from prematurely passing through the outlet 24 of the reuseable oil filter 10.

With the above-described configuration, once the reuseable oil filter 10 is installed in place, there should be no apparent need to ever remove, replace and/or dispose the reuseable oil filter 10. If the reuseable oil filter 10 ever does need to be replaced or if someone affirmatively opts to periodically replace the reuseable oil filter 10, the intervals between replacements will be much greater than those associated with conventional oil filters.

According to various aspects, the reuseable oil filter 10 further includes one or more sensing devices 34 configured to determine one or more parameters of the oil in the reuseable oil filter 10. The one or more sensing devices 34 may be any suitable type or types of sensing device and may be positioned anywhere within or external to the housing 12. For example, according to various aspects, at least one of the sensing devices 34 is configured to sense or measure the cleanliness of the oil in the reuseable oil filter 10. According to other aspects, at least one of the sensing devices 34 is configured to sense or measure opacity of the oil. According to various aspects, at least one of the sensing devices 34 is configured to sense or measure a particle count within the oil. According to various aspects, at least one of the sensing devices 34 is configured to sense or measure an acidity of the oil. According to various aspects, a pair of the sensing devices 34 are configured to sense or measure a pressure drop from one of the sensing device 34 positioned at one part of the flow path of the oil to another one of the sensing devices 34 positioned at another part of the flow path of the oil. According to various aspects, one or more of the sensing devices 34 is configured to determine the amount of time the oil has been present in the reuseable oil filter 10. According to various embodiments, one or more of the sensing devices 34 is configured to perform a spectrographic analysis of the oil present in the reuseable oil filter 10. According to various aspects, one or more of the sensing devices 34 is configured to capture and analyze an oil sample and/or contaminants. It will be appreciated that the one or more sensors 34 may be configured for many other functionalities than the above examples. It will also be appreciated that captured oil samples and/or contaminants may also be analyzed external to the reuseable oil filter 10 (e.g., at a laboratory).

As set forth above, for the purge operation, according to various aspects the cleaning fluid may be delivered at a substantially greater pressure than that of the oil delivered to the reuseable oil filter 10 under normal operation. However, for instances where a higher flow is not possible, various aspects of the reuseable oil filter 10 may further include a traveling element 36 (See FIG. 3) configured to travel "up" and "down" within the housing 12, effectively concentrating the flow of the cleaning fluid on one section of the filter element 14 until the section is considered clean, then moving section by section in a similar manner until all of the sections of the filter element 14 have been cleaned/purged.

Figure 3:
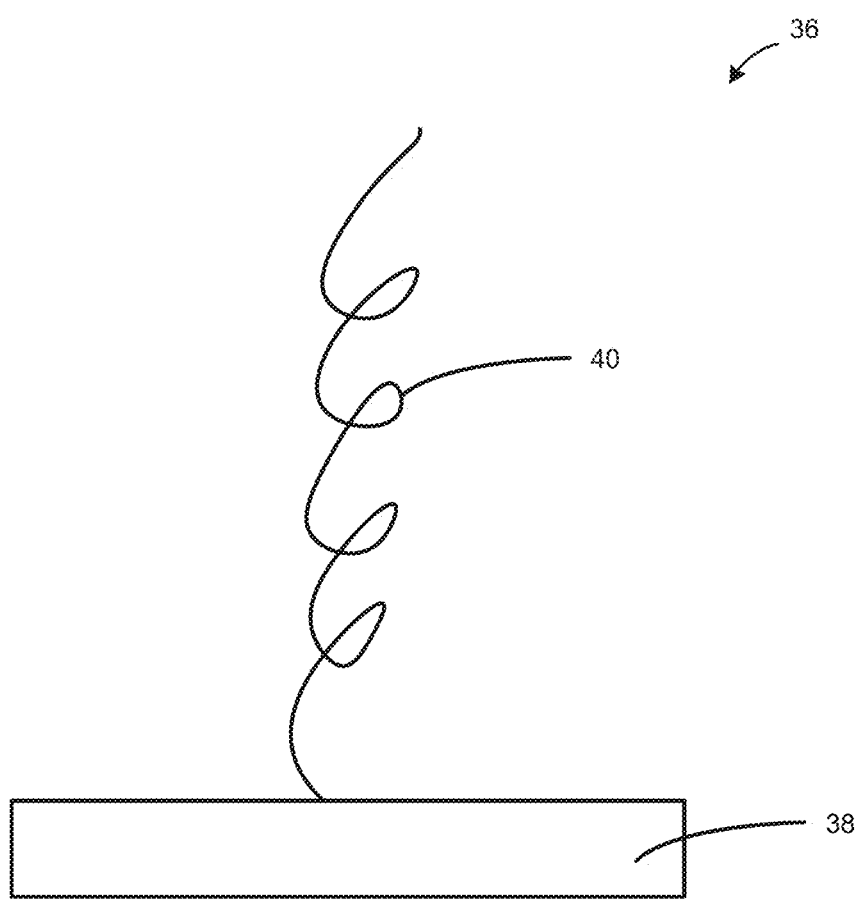
FIG. 3 illustrates various aspects of a traveling member of the reuseable oil filter of FIG. 2.

FIG. 3 illustrates various aspects of the traveling element 36. The traveling element 36 includes a base member 38 which is configured prevent the cleaning fluid entering through the port 30 during a purge operation from passing by the base member 38 and reaching the outlet 24 of the reuseable oil filter 10. According to various aspects, the traveling member 36 includes a spiral-like shaped element 40 connected to a center of the base member 38, where rotation of the spiral-like shaped element 40 in a first direction causes the base member 38 to move "upwards" and rotation of the spiral-like shaped element 40 in a second direction (opposite the first direction) causes the base member 38 to move "downwards", thereby allowing the filter element 14 to be cleaned in an incremental section-by-section manner. For the cylindrical shaped reuseable oil filter 10 of FIG. 2, the "upward" and "downward" movement of the base member 38 is a longitudinal movement along a longitudinal axis (not shown) of the reuseable oil filter 10. According to other aspects, the traveling member 36 includes two spiral-like shaped elements 40, one on the "left" side of the base member 38 and one of the "right" side of the base member 38 (opposite the "left" side). It will be appreciated that any number of arrangements/configurations other than the spiral-like shaped element(s) 40 may be utilized to move the base member 38 or a similar blocking type structure "upwards" and "downwards" within the clean side 22 of the reuseable oil filter 10.

According to various aspects, station pumps could be programmed to deliver higher flow during the purge operation and shift valves of the valve assembly 26 into desired positions, and the station pumps could also be programmed to deliver lower flow during the refill operation without shifting valves of the valve assembly 26 to block the outlet 24 and prevent oil from the dirty side 20 of the reuseable oil filter 10 from exiting the port 32. Alternatively, a control system can be programmed to actuate an evacuation pump and a purge pump at the same time and shift valves of the valve assembly 26 so that only a combination of a purging action and the lower pressure of an evacuation action prevents flow out the outlet 24 of the reuseable oil filter 10 and allows for flow out of the dirty side 20 of the reuseable oil filter 10.

In view of the above, it will be appreciated that for an application where the reuseable oil filter 10 is utilized with a vehicle or a movable machine, the vehicle or movable machine may be pulled into a service station for robotic fueling and a change of oil. After the quick connects are coupled to the purge and refill system and to the evacuation system, the purge process may be utilized to cleanse one or more reuseable oil filters 10 of the vehicle/machine by employing the reverse flow pressurization process described above. Any captured oil samples or contaminants can be analyzed by the one or more sensors 34 in real time, or analyzed at a later time in a laboratory.

Following the completion of the purge process, or concurrently with the purge process, the evacuation process may be utilized to evacuate any cleaning fluid, oil or contaminants from the reuseable oil filters 10 and or an external sump (e.g., an engine sump). Following the completion of the evacuation process, the refill process may be utilized to deliver new oil to the dirty side 20 of the reuseable oil filter 10 or to deliver ultra-filtered oil to the clean side 22 of the reuseable oil filter 10. Either variation of the refill process prefills a cleaned reuseable oil filter 10 (for an instant read on the oil level), filters new oil, and prelubricates the engine/machine. According to various aspects, the oil level on a dipstick can be sensed/measured for a live reading/determination and utilized to stop the oil refill at the correct or optimum level. According to other aspects, a sensing device positioned in, for example, the evacuation line, can output a signal to automatically stop the oil refill at the correct or optimum level.

EXAMPLES

Example 1

A system is provided. The system comprises a reuseable oil filter, a first port, a second port and a valve assembly. The reuseable oil filter has an inlet and an outlet, and includes a housing and a filter element positioned within the housing. The valve assembly is in selective fluid communication with the reuseable oil filter, the first port and the second port.

Example 2

The system of Example 1, wherein the housing comprises a metal.

Example 3

The system of Examples 1 or 2, wherein the filter element comprises a metal.

Example 4

The system of Examples 1 or 2, wherein the filter element comprises a nanoparticle.

Example 5

The system of Examples 1, 2, 3 or 4, wherein the valve assembly is positioned within the housing.

Example 6

The system of Examples 1, 2, 3, 4 or 5, wherein the valve assembly is configured to selectively control (1) delivery of a cleaning fluid to a clean side of the reuseable oil filter, (2) delivery of new oil to a dirty side of the reuseable oil filter and (3) evacuation of dirty oil from a dirty side of the reuseable oil filter.

Example 7

The system of Examples 1, 2, 3, 4, 5 or 6, further comprising a blocking member configured to selectively block a fluid on a clean side of the reuseable oil filter from passing out of the outlet of the reuseable oil filter.

Example 8

The system of Example 7, wherein the blocking member is positioned within the housing.

Example 9

The system of Examples 1, 2, 3, 4, 5, 6, 7 or 8, further comprising one or more sensing devices configured to measure a parameter of oil in the reuseable oil filter.

Example 10

The system of Example 9, wherein at least one of the one or more sensing devices is positioned within the housing.

Example 11

The system of Examples 1, 2, 3, 4, 5, 6, 7, 8, 9 or 10, further comprising a traveling element positioned within the housing, wherein the traveling element is configured to move along a clean side of the reuseable oil filter.

Example 12

The system of Examples 1, 2, 3, 4, 5, 6, 7, 8, 9, 10 or 11, further comprising (1) a first quick disconnect couplable to the first port and (2) a second quick disconnect couplable to the second port.

Example 13

A system is provided. The system comprises a reuseable oil filter, a first port, a second port, a valve assembly in fluidic communication with the reuseable oil filter and a sensing device. The reuseable oil filter includes an inlet and an outlet, and comprises a housing and a filter element positioned within the housing. At least one of the valve assembly and the sensing device is positioned within the housing.

Example 14

The system of Example 13, wherein the valve assembly is configured to selectively control (1) delivery of a cleaning fluid to a clean side of the reuseable oil filter during a purge operation, (2) delivery of new oil to a dirty side of the reuseable oil filter during a refill operation and (3) evacuation of dirty oil from a dirty side of the reuseable oil filter during an evacuation operation.

Example 15

The system of Examples 13 or 14, further comprising a blocking member configured to selectively block a fluid on a clean side of the reuseable oil filter from passing out of the outlet of the reuseable oil filter.

Example 16

The system of Examples 13, 14 or 15, wherein the valve assembly comprises the blocking assembly.

Example 17

The system of Examples 13, 14, 15 or 16, further comprising a traveling element positioned within the housing, wherein the traveling element is configured to move along a clean side of the reuseable oil filter.

Example 18

The system of Examples 13, 14, 15, 16 or 17, further comprising (1) a first quick disconnect couplable to the first port and (2) a second quick disconnect couplable to the second port.

Example 19

A reuseable oil filter is provided. The reuseable oil filter comprises an inlet, an outlet fluidically coupled to the inlet, a housing, a filter element a first port, a second port. The filter element is positioned within the housing and defines an outer surface and an inner surface. The reuseable oil filter further comprises a valve assembly positioned within the housing, wherein the valve assembly is in selective fluidic communication with the following (1) a first volume proximate the outer surface of the filter element, (2) a second volume proximate the inner surface of the filter element, (3) the first port and (4) the second port.

Example 20

The system of Example 19, further comprising a sensing device positioned within the housing.

Although the various aspects of the reuseable oil filter 10 have been described herein in connection with certain disclosed aspects, many modifications and variations to those aspects may be implemented. Also, where materials are disclosed for certain components, other materials may be used. Furthermore, according to various embodiments, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a reuseable oil filter, the general principles of the invention are equally applicable to other types of reuseable fluidic filters.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system, comprising:
a reusable engine oil filter having an inlet and an outlet and configured to be cleaned and reused without having to be disconnected or removed from an internal combustion engine, the reusable engine oil filter comprising:
a housing; and
a filter element positioned within and surrounded by the housing;
a first port couplable to at least one of a purge system and a refill system;
a second port couplable to an evacuation system;
a valve assembly in fluidic communication with the reusable engine oil filter;
a sensing device positioned within the housing, wherein the sensing device is configured to measure a quality of an oil within the reusable engine oil filter, wherein the measured quality comprises an age of the oil, wherein the valve assembly is configured to selectively open and close the first port and the second port such that, once the reusable engine oil filter is installed in place, the reusable engine oil filter can be cleaned and reused without removal; and
a traveling element positioned adjacent a clean side of the filter element, wherein the traveling element is selectively movable between a first position and a second position, wherein the traveling element is configured to prevent cleaning fluid from passing and reaching the outlet during a purge operation, and wherein moving the traveling element between the first position and the second position allows the filter element to be cleaned in an incremental section-by-section manner.

2. The system of claim 1, wherein the valve assembly is configured to selectively control:
delivery of the cleaning fluid through the first port to the clean side of the filter element during the purge operation;
delivery of new oil through the first port to a dirty side of the reusable engine oil filter during a refill operation; and
evacuation of dirty oil from a dirty side of the filter element during an evacuation operation for delivery to an external system via the second port.

3. The system of claim 1, further comprising a blocking member configured to selectively block a fluid on a clean side of the filter element from passing out of the outlet of the reusable engine oil filter.

4. The system of claim 1, further comprising:
a first quick disconnect couplable to the first port; and
a second quick disconnect couplable to the second port.

5. A reusable engine oil filter system, comprising:
a filter element;
an oil inlet in fluid communication with a first side of the filter element;
an oil outlet in fluid communication with a second side of the filter element;
a valve assembly selectively changeable between a first condition and a second condition, wherein the valve assembly establishes fluid communication between a purge fluid inlet and the second side of the filter element in the first condition, and wherein the valve assembly prevents fluid communication between the purge fluid inlet and the second side of the filter element in the second condition; and
a traveling element positioned adjacent the second side of the filter element, wherein the traveling element comprises a base member that is selectively movable between a first position and a second position, wherein the base member is configured to prevent purge fluid entering from the purge fluid inlet from passing and reaching the oil outlet when the valve assembly is in the first condition, and wherein moving the traveling element between the first position and the second position allows the filter element to be cleaned in an incremental section-by-section manner.

6. The reusable engine oil filter of claim 5, further comprising a housing configured to be installed within an internal combustion engine, wherein the filter element, the valve assembly, and the traveling element are positioned within the housing.

7. The reusable engine oil filter of claim 5, wherein the filter element comprises a metal.

8. The reusable engine oil filter of claim 5, wherein the filter element comprises a nanoparticle.

9. The reusable engine oil filter of claim 5, wherein the first side of the filter element is a dirty side of the filter element, wherein the second side of the filter element is a clean side of the filter element, wherein the valve assembly is configured to selectively control:

delivery of a cleaning fluid to the clean side of the filter element;

delivery of new oil to the dirty side of the filter element; and evacuation of dirty oil from the dirty side of the filter element for delivery to an external system.

10. The reusable engine oil filter of claim 5, further comprising a sensing device configured to measure a parameter of oil in the reusable engine oil filter.

11. The reusable engine oil filter of claim 5, wherein the traveling element further comprises a spiral shaped element configured to rotate, wherein rotation of the spiral shaped element causes the traveling element to move between the first position and the second position.

12. The reusable engine oil filter of claim 5, further comprising a blocking member selectively movable between a first position and a second position, wherein the blocking member blocks the oil outlet in the first position and wherein the blocking member does not block the oil outlet in the second position, such that when the valve assembly is in the first condition and the blocking member is in the first position, the valve assembly establishes fluid communication between the purge fluid inlet and the second side of the filter element and the blocking member blocks the oil outlet.

* * * * *